United States Patent [19]
Mischutin

[11] 3,955,032
[45] *May 4, 1976

[54] FLAME RETARDANTS FOR NATURAL AND SYNTHETIC MATERIALS

[75] Inventor: Vladimir Mischutin, Union City, N.J.

[73] Assignee: White Chemical Corporation, Bayonne, N.J.

[ * ] Notice: The portion of the term of this patent subsequent to Aug. 15, 1992, has been disclaimed.

[22] Filed: Nov. 14, 1973

[21] Appl. No.: 415,667

Related U.S. Application Data

[63] Continuation-in-part of Ser. No. 300,731, Oct. 25, 1972, Pat. No. 3,877,974.

[52] U.S. Cl. ............................... 428/290; 252/8.1; 427/390; 427/392; 428/275; 428/921
[51] Int. Cl.$^2$ .................... B32B 27/20; C09K 3/28
[58] Field of Search ............. 117/136, 137; 252/8.1; 106/15 FP; 260/DIG. 24; 161/403; 428/290, 275, 921; 427/390, 392

[56] References Cited
UNITED STATES PATENTS

| | | | |
|---|---|---|---|
| 2,668,294 | 2/1954 | Gilpin | 117/155 UA |
| 3,093,599 | 6/1963 | Mueller-Tamm et al. | 260/2.5 |
| 3,470,116 | 9/1969 | Praetzel et al. | 260/DIG. 24 |
| 3,658,634 | 4/1972 | Yanagi et al. | 106/15 FP |
| 3,668,155 | 6/1972 | Raley | 117/137 X |
| 3,770,577 | 11/1973 | Humphrey | 117/137 X |
| 3,877,974 | 4/1975 | Mischutin | 428/290 |

FOREIGN PATENTS OR APPLICATIONS

| | | | |
|---|---|---|---|
| 1,191,569 | 3/1968 | Germany | 117/136 |

*Primary Examiner*—Harry J. Gwinnell
*Attorney, Agent, or Firm*—Thomas B. Graham

[57] ABSTRACT

A process for rendering natural and synthetic materials and blends of the same flame retardant which entails treating the same with an aqueous dispersion of the flame retardant agent reduced to a finely divided state suspended in a latex medium and applied to the material with a finely divided metal oxide as synergist, by any convenient means; dried and set in place by baking. The active flame retardant agents are chlorinated cyclopentadieno compounds, chlorobrominated cyclopentadieno compounds, applied alone or in admixture with each other, or in admixture with brominated cyclopentadieno compounds, and in admixture with metallic oxides. The active flame retardant agents are reduced to a fine state of subdivision, preferably under 2 microns average particle diameter.

11 Claims, No Drawings

FLAME RETARDANTS FOR NATURAL AND SYNTHETIC MATERIALS

RELATED APPLICATION

This application is a continuation in part of my application filed Oct. 25, 1972, Ser. No. 300,731, now U.S. Pat. No. 3,877,974.

BACKGROUND OF THE INVENTION

Synthetic and natural fibers in combinations on the market in various articles of clothing, as well as other utilitarian articles, having produced a problem of safety. Recent legislation requires a certain level of flame resistance of fabrics and fabric blends.

The technique is to impregnate the fiber or the textile material, with a compound which is a flame retardant.

In the accomplishment of the objectives of this invention, which are to reduce the flammability of a natural or synthetic fabric, whether the flammability be that of a fiber itself or of a plastic polymer material on the fiber, it is the basic object of this invention to render the fabric flame resistant.

Other objects and advantages of the invention will in part be obvious and in part appear hereinafter.

DETAILED DESCRIPTION OF THE INVENTION

This invention may be considered an extension of the technique described in my copending U.S. application Ser. No. 300,731, filed Oct. 25, 1972.

In that application I have described the technique of employing a large family of brominated organic compounds as flame retardant material. The essential requirement of the compound to develop the flame retardance is a high bromine content to form a compound which is extremely insoluble in water. The technique of application involves reducing the compound to an extremely fine state of subdivision, to a micron or submicron size, preferably something less than about 2 microns in diameter, suspending the thus finely divided material in an aqueous medium and employing the suspension as a component of a latex which is used for the application of dye or the like to the fabric, the latex being any of a large class of aqueous compositions of suitable polymeric adhesive binder compatible with fabrics, for use in the formation of coatings of this type.

In this respect reference may be had to my co-pending application Ser. No. 300,731 which should be deemed to be fully incorporated herein.

The nature of the compounds useful for the purposes of this invention may be summarized as follows: in my co-pending application I have described and classified a large variety of organic bromine compounds useful for the purposes of the invention.

I have found a corresponding smaller family of chlorine compounds and mixed chlorine bromine compounds to be useful in the formulation of products of the nature described comparable with the bromine compounds when used in the same amounts and applied under the same conditions.

This family of compounds may be described as follows:

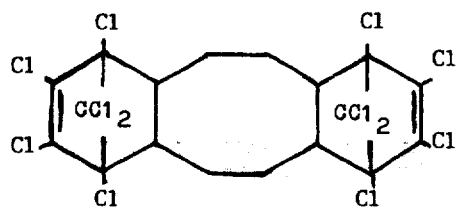

Bis(hexachlorocyclopentadieno - cyclooctane

I

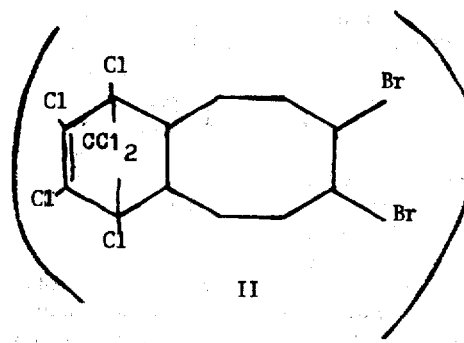

DiBromohexachlorocyclopentadieno - cyclooctane

II

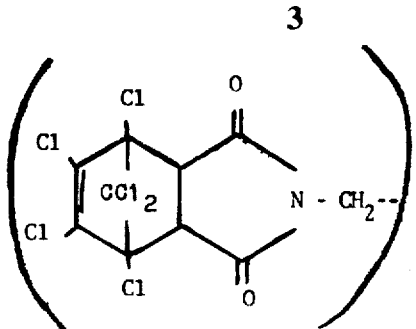

N,N$^1$-ethylbis(hexachlorocyclopentadieno dicarboximide)

III

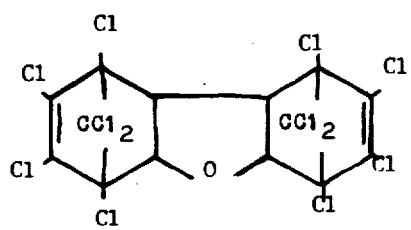

Bis(hexachloro cyclopentadieno furane)

IV

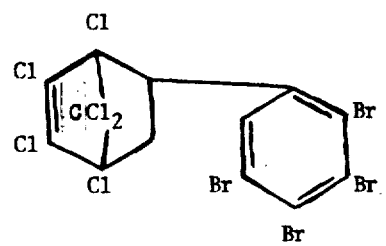

Hexachlorocyclopentadieno Tetrabromobenzene

V

And any chlorinated or chlorobrominated compound which is a solid at room temperature, substantially insoluble in water and which can be milled to an average particle size of 2 microns or less.

As the adhesive binder, an aqueous emulsion of a suitable high molecular weight polymeric adhesive binder is used, as described in my prior copending application Ser. No. 300,731. The weight ratio of halogenated compound to metallic oxide is 1:4 parts of said compound to 0.1:1 part of metallic oxide. The amount of binder employed is sufficient to secure said halogenated compounds and metallic oxide flame retardant composition to the material being treated, and the total amount of flame retardant deposited on the material is effective to reduce the flammability of the textile and is durable to laundering and dry cleaning.

For specific examples illustrating the technique of application of the finely divided chlorine compounds to fabrics reference may be had to any of the examples of my prior co-pending application Ser. No. 300,731 and substituting as the flame retardant a chlorine compound or chlorobromo, or chlorobrominated, or mixture of either or both with brominated organic compound.

EXAMPLE I

Five pounds of a compound obtained by reacting two moles of hexachlorocyclopentadiene with one mole 1.5 cyclooctadiene having a melting point about 350°C and containing 33.4% carbon and 65.2% chlorine, were finely divided by the use of an air impact mill. Microscopic examination of the milled material showed that 90% of all particles were less than two microns in size and no single particle was larger than five microns.

Ninety parts of the micropulverized diadduct of 1,5-cyclooctadiene with hexachloropentadiene were slowly added to 59.4 parts of water, under strong agitation, containing 0.3 part of a hydroxyethyl cellulose thickener, 2.0 parts of a sodium alkyl aryl ether sulfate wetting agent and 0.5 part of a condensed naphthalene sulfonic acid dispersing agent. After addition was completed, 45.0 parts of antimony trioxide having an average particle size of one micron were slowly added under vigorous agitation to the dispersion of the chlorinated compound. The dispersion thus obtained was agitated for an additional hour to break up all agglomerates. This dispersion was marked "Dispersion I".

Fifty parts of "Dispersion I" were diluted with 33 parts of water containing 0.5 part of an ethyxylated nonyl phenol wetting agent and eighteen parts of a 50% emulsion of a copolymer of butyl acrylate with n-methylol acrylamide. This solution was labeled "Solution I".

A piece of bleached, mercerized, 80 × 80 cotton fabric weighing 4 ounces/square yard and a cotton twill, were submerged in Solution I and the excess removed by squeezing between two rollers. The lighter weight fabric picked-up 110% and the heavier weight material absorbed 80% of its dry weight of Solution I. Both fabrics were dried at 120°C and baked at 160°C for 3 minutes.

The treated materials were scoured with an aqueous solution containing 5 grams per liter of sodium carbonate and 10 grams per liter of 50% solution of hydrogen peroxide at 80°C for 5 minutes. The fabrcis were now rinsed with hot and cold water and dried.

The treated fabric possessed a very soft hand and retained its original white color. The flame retardant properties were evaluated using AATCC (American Association of Textile Chemists & Colorists) test method 34-1966. The lighter weight fabric gave 3.5 inches *8.75 centimter) char length and the heavier fabric gave two inches (5 centimeters) char length.

EXAMPLE II

A sample of a compound identified as No. V, having a melting point of 179°C and an elemental analysis of 22.2% carbon, 0.7% hydrogen, 29.5% chlrine and 44.3% bromine, was micropulverized using an air impact mill. Microscopic observation of the pulverized materials revealed that 90% of the particles were two microns or less in size.

Ninety parts of micropulverized No. V and 45 parts of finely divided antimony trioxide were dispersed by adding them slowly to 59.4 parts of water, under rapid agitation, containing 2.0 parts of anionic wetting agent, 0.5 part of dispersing agent and 0.3 part of hydroxyethyl cellulose thickener as in Example I. This dispersion is designated "Dispersion II".

Fifty parts of "Dispersion II" were diluted in 33 parts of water containing 0.5 part non-ionic wetting agent and 17 parts of a 50% active latex described as a butyl acrylate-n-methylol acrylamid-acrylonitrile copolymer. This solution was designated "Solution II".

Fabrics composed of 100% cotton 4 ounces/square yard 50% polyester/50% cotton 5 ounces/square yards, and 65% polyester/35% cotton, all bleached and mercerized, were submerged in "Solution II" and the excess solution removed by squeezing between two rollers. The wet pick-ups obtained in each case were:

| 100% Cotton | 110% |
| 50/50 Polyester/Cotton | 90% |
| 65/35 Polyester/Cotton | 100% |

The fabrics were dried, cured and afterscoured as in Example I.

Flame retardancy when tested according to AATCC Method 34-1966 was:

| | CHAR LENGTH (INCHES) |
|---|---|
| 100% Cotton | 2.5 |
| 50/50 Polyester/Cotton | 1.5 |
| 65/35 Polyester/Cotton | 3.0 |

EXAMPLE III

Forty-five parts of diadduct of 1,5-cyclooctadiene with hexachlorocyclopentadiene, 45 parts of decabromodiphenyl oxide and forty-five parts of antimony trioxide all three materials being in a micropulverized state, were dispersed in 59.4 parts of water as described in Example I particle size under 2 microns and Example II. This dispersion was designated "Dispersion III".

Fifty parts of dispersion III were diluted with 33 parts of water and seventeen parts of a 50% active acrylic latex described as a copolymer of ethyl acrylate and n-methylol acrylamide. This solution was designated as "Solution III".

Samples of the same fabrics as described in Example II were treated similarly as described in this example obtaining the same wet pick-ups. Flame retardancies obtained were:

| | CHAR LENGTH (INCHES) |
|---|---|
| 100% Cotton | 2.0 |
| 50/50 Polyester/Cotton | 1.5 |
| 65/35 Polyester/Cotton | 2.5 |

EXAMPLE IV

Fifty grams each of "Dispersions I, II and III" were added to 200 grams of a 50% active acrylic emulsion copolymer and agitated until uniform. To these Dispersions 5 grams of a 28% active alkali swellable acrylic emulsion copolymer were added under agitation and the pH was adjusted to 8.0 by adding dropwise 0.6 gram of a 30% solution of ammonium hydroxide. The swelling of the polymer resulted in an increase of the viscosities of the solutions. These solutions were designated "Solutions IVA, IVB, and IVC".

Samples of woven fiberglass drapery fabric were treated with "Solutions IVA, IVB, and IVC" by coating them on one side with the use of a doctor blade, adjusted to give a film thickness of 0.030 inch. The fabrics were now dried at 120°C and and cured at 160°C for 3 minutes.

The flame retardancy of the coated fiberglass samples was tested according to AATCC Method 34-1966 giving a Char Length between 2 and 3 inches.

In recapitulation, thus, it will be evident that this invention is an extension of that described in my copending application Ser. No. 300,731 in that I have identified a class of chlorinated compounds and chlorobrominated compounds useful as fire retardants either employed alone or in a mixture with each other or mixed with a brominated compound when applied in amounts and by techniques parallel to those I employ with the bromine compounds.

What is claimed is:

1. A method of rendering flammable textile materials flame retardant which comprises: treating said materials with a flame retardant composition consisting essentially of chlorinated cyclopentadieno compounds, chlorobrominated cyclopentadieno compounds, employed alone or in admixture with each other, or in admixture with brominated cyclopentadieno compounds, and a metallic oxide, in aqueous dispersion, in admixture with an aqueous emulsion of a suitable high molecular weight polymeric adhesive binder, said compounds and metallic oxide being solids at room temperature, substantially totally insoluble in water, having been reduced to an average particle size below 2 microns, and being in weight ratio of 1:4 parts of said compounds to 0.1:1 part of metallic oxide, said high molecular weight polymeric binder being present in amount sufficient to secure said compounds and metallic oxide flame retardant composition to said material, and drying and curing said treated material, wherein the total amount of flame retardant deposited on said material is effective to reduce the flammability of the textile and is durable to laundering and dry cleaning.

2. The method in accordance with claim 1 wherein the said compound is a chlorobrominated compound and wherein the chlorine and the bromine are both in the same molecule.

3. The method in accordance with claim 1 wherein the compound is a physical mixture of chlorinated and brominated compounds, the chlorine and bromine being on different molecules.

4. The method in accordance with claim 1 wherein the adhesive polymeric binder itself is flame retarded by the organic compound-metallic oxide mixture.

5. The method in accordance with claim 1, wherein said treating is by padding.

6. The method in accordance with claim 1, wherein said treating is by knife coating.

7. The method of claim 1, wherein the chlorinated material is selected from the group consisting of;
Bis(hexachlorocyclopentadieno)cyclooctane
N,N'-ethylbis(hexachlorocyclopentadieno)-dicarboximide
Bis(hexachlorocyclopentadieno)-furan.

8. The method of claim 1, wherein the chlorobrominated solid materials are selected from the group consisting of:
Hexachlorocyclopentadieno-dibromocyclooctane
Hexachclorocyclopentadieno-tetrabromobenzene.

9. The method of claim 4, wherein the polymeric adhesives are selected from the group consisting of:
polymers or copolymers of esters of acrylic or methacrylic acids
copolymers of styrene and butadiene
copolymers of acrylonitrile-styrene-butadiene
copolymers of esters of acrylic or methacrylic acid-n-methylolacrylamine-acrylonitrile
polymers of polyurethane.

10. A material inherently flammable, rendered flame retardant by treatment in accordance with the process of claim 9.

11. The method in accordance with claim 1 wherein the said compounds are all chlorinated.

* * * * *

UNITED STATES PATENT OFFICE
CERTIFICATE OF CORRECTION

Patent No. 3,955,032                     Dated    May 4, 1976

Inventor(s)   Vladimir Mischutin

It is certified that error appears in the above-identified patent and that said Letters Patent are hereby corrected as shown below:

" [ * ] Notice:   The portion of the term of this patent subsequent to Aug. 15, 1992, has been disclaimed."

should read:

- - [ * ] Notice:   The portion of the term of this patent subsequent to Apr. 15, 1992, has been disclaimed. - -

Signed and Sealed this

Twenty-second Day of November 1977

[SEAL]

Attest:

RUTH C. MASON
Attesting Officer

LUTRELLE F. PARKER
Acting Commissioner of Patents and Trademarks